Oct. 9, 1923.  
E. G. K. ANDERSON  
1,469,982  
MOUNTING FOR UNIVERSAL SPOTLAMPS  
Filed Aug. 11, 1921  
2 Sheets-Sheet 1

Inventor:—
ERNST G. K. ANDERSON
by: William L. Hale
Atty.

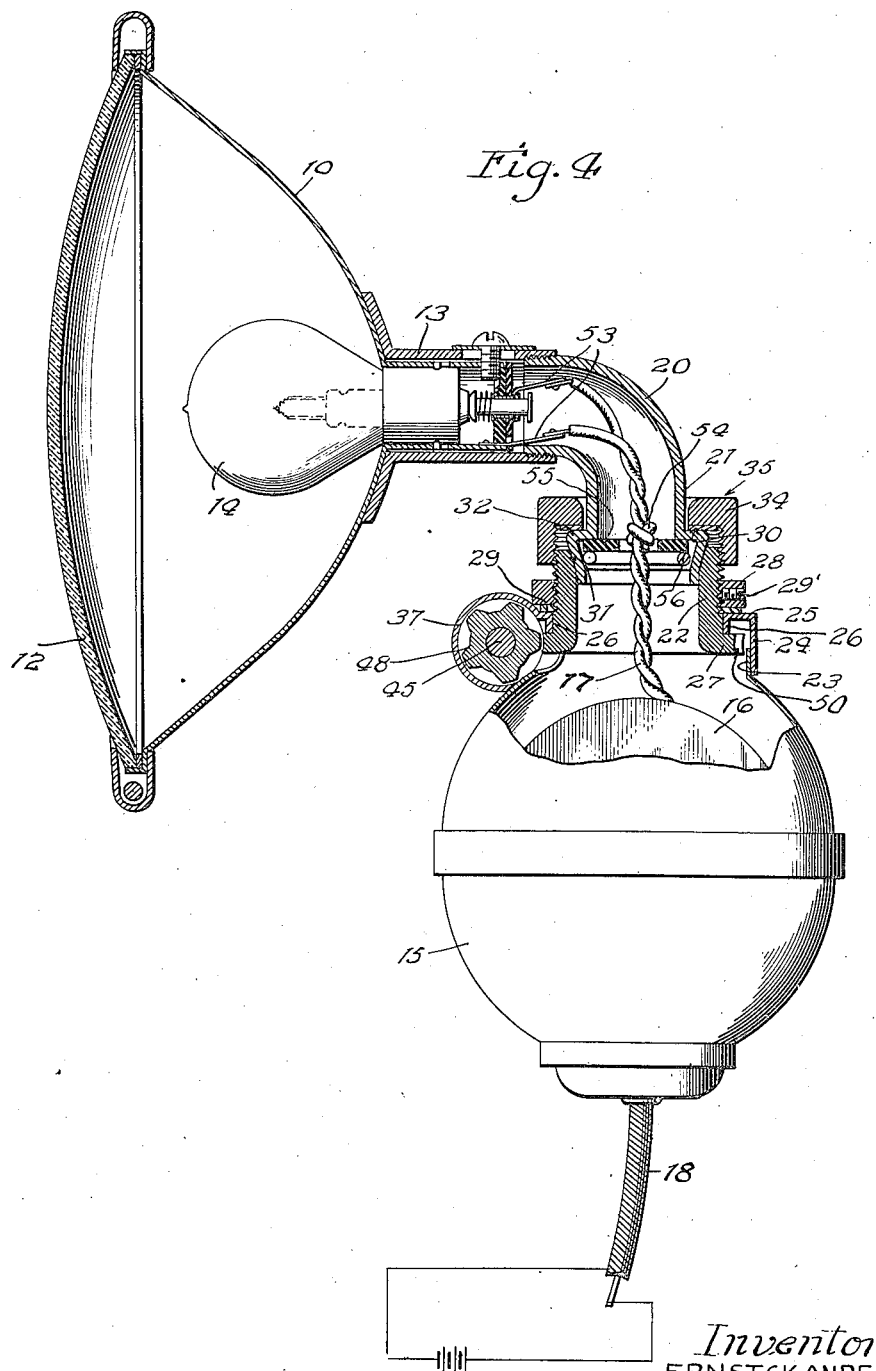

Patented Oct. 9, 1923.

1,469,982

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

MOUNTING FOR UNIVERSAL SPOTLAMPS.

Application filed August 11, 1921. Serial No. 491,608.

*To all whom it may concern:*

Be it known that I, ERNEST G. K. ANDERSON, a citizen of the United States, and a resident of Chicago, in the county of Cook and State of Illinois, have invented certain new and useful Improvements in Mountings for Universal Spotlamps; and I do hereby declare that the following is a full, clear, and exact description thereof, reference being had to the accompanying drawings, and to the characters of reference marked thereon, which form a part of this specification.

This invention relates to improvements in universally operable spot or signal lamps for vehicles, and refers more especially to that type of lamp structure in which the lamp mounting is so supported on the vehicle body that the lamp itself is supported exterior to the body and the operating or adjusting means extends into the body or other point distant from the lamp, so that, when used in a vehicle body, the operating means are in position to be manipulated by the driver of the vehicle to enable the lamp to be adjusted to throw its rays in substantially universal directions from the point of suspension of the lamp on the vehicle.

Reference herein to "lamp" will be taken to mean the entire lamp structure, including all parts necessary to support the lamp casing and enclose and support the lamp bulb, its switch contacts, and mechanism, unless the context indicates direct reference to the lamp bulb.

Among the objects of the invention is to provide an exceedingly simple, inexpensive, and effective mounting and operating mechanism for spot lamps of this character, and the invention consists in the combination and arrangement of the parts shown in the drawings and described in the specification, and is pointed out in the appended claims.

The present invention is shown as adapted for use in connection with that type of demountable lamp structure in which the lamp is so supported as to be capable of being demounted and moved away from its normal station on the vehicle to operate as a trouble lamp, and in which the lamp proper is maintained in circuit with a suitable source of current supply, when acting as a trouble lamp, through a lamp cord that is normally wound about a reel when the lamp occupies its normal station, and is unwindable from the reel when the lamp is demounted and is being moved towards and from its normal station. The structure embodying my invention, however, is capable of adaptation to other types of lamps and to lamps which are not demountable.

As shown in the drawings:

Figure 4 is a partial vertical side elevation and partial sectional view of the lamp, showing a portion of the operating mechanism, including the rewinding reel and its appurtenances, constituting one type of lamp to which my invention is capable of adaptation.

Figure 1:
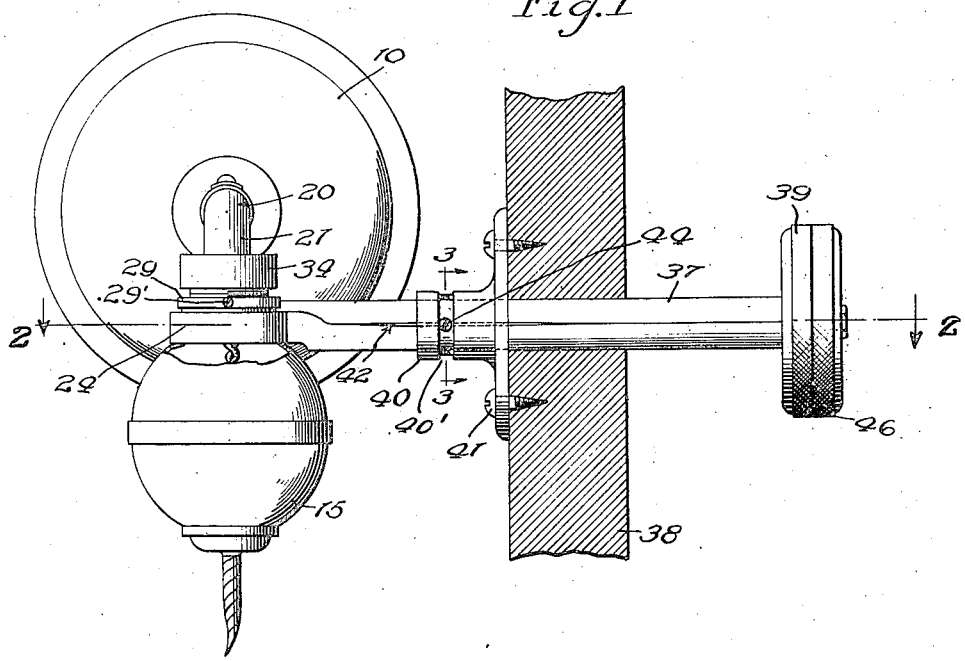
Figure 1 is a rear view of a lamp, indicating its adaptation to a closed body vehicle.
Figure 2:
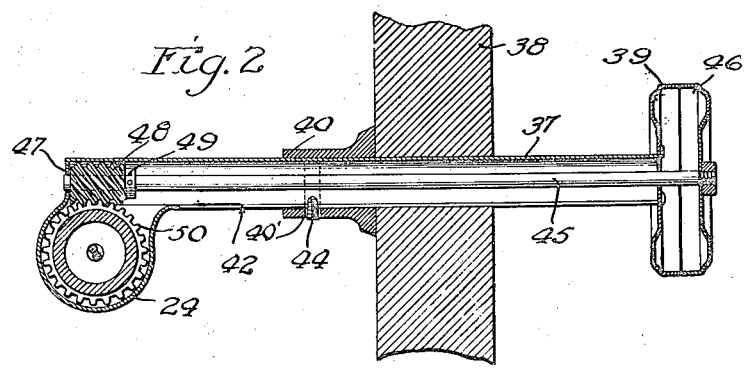
Figure 2 is a section on the line 2—2 of Figure 1.
Figure 3:
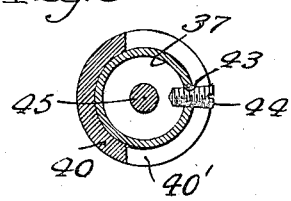
Figure 3 is a cross section on the line 3—3 of Figure 1.

As shown in the drawings, 10 designates the casing of a lamp that is closed at its forward open end by a lens 12, and is provided at its rear end with a nipple or tube-like extension 13 to receive a known form of shell for the electric lamp bulb base 14. 15 designates a reel casing which contains and supports a reel 16 on which the lamp cord 17 is wound when the lamp occupies its normal station on the vehicle, and from which the cord can be unwound when the lamp is to be removed from its station to constitute a trouble lamp. 18 designates a cord, the conductors of which are connected at one end of the cord to an external source of current, as shown in Figure 4. The conductors of said cord 18 are adapted to be connected at their other ends to fixed wipers through which the current of the external circuit is connected to conducting plates that rotate with the reel and are electrically connected to the reel ends of the conductors of the cord 17, through the conductors of which current is conducted to the lamp bulb, as will hereinafter be more fully described. Alternatively one side of the external circuit may be connected to ground, as shown in the copending application for United States Letters Patent of myself and Paul W. Swanson, Serial Number 492,036, filed on the 13th day of August, 1921. These features of construction are generally similar to that shown in my prior United States Letters Patent, Number 1,309,678, granted July 15, 1919, the electrical connection of the conductors of the lamp and external cords being indicated in dotted lines.

20 designates an elbow fitting, the horizontal portion of which is threaded or otherwise fixed to the lamp casing nipple 13. The other or vertical portion 21 of said elbow fitting is formed to provide between it and the shell or casing for the reel a rotative mounting which permits the lamp casing, supported by said reel casing, to be swung in horizontal direction by mechanism hereinafter to be described. The bearing by which the elbow fitting is thus rotatively supported on the reel casing is made as follows:

It comprises a metal neck 22 which is fixed in any suitable manner to an upstanding tubular flange 23 at the top of the upper section of the reel casing 15. Said neck is shown as fastened to the casing by means of a ring 24 that surrounds and closely fits, and is brazed or otherwise fastened to said flange 23. Said ring 24 is formed with an inturned, annular flange 25 which terminates in a downwardly extending cylindric skirt 26 that closely fits against the neck and bears on the upper face of an annular flange 27 at the lower end of the neck 22. A lock nut 28, threaded exteriorly to the neck 22, locks said skirt 26 downwardly on the radial flange 27 of the neck 22 and, preferably, a compressible washer 29 is interposed between said lock nut and the ring flange 25 to permit a friction pressure exerted by the lock nut 28 to be exerted on the flange of said neck. Said lock nut 28 may be locked to said neck by a set screw 29'.

The vertical member 21 of the elbow fitting is formed at its lower end to provide a hollow head 30 that is exteriorly tapered to closely fit within an upwardly flaring or tapered surface 31 at the upper, open end of the neck 22. This formation provides an upwardly facing shoulder 32 on the tapered head of the fitting, and said fitting is locked or confined against the tapered surface 31 of the neck by a lock nut 34 that is exteriorly threaded to said neck and is formed with a hollow, inturned, radial flange 35 that bears against the shoulder 32 to lock the tapered portions of the fitting and neck. Thereby the said fitting and the lamp casing carried thereby are locked from accidental disadjustment of the parts in horizontal direction, while permitting the fitting to rotate relatively to the neck and to thereby impart sidewise sweep to the lamp. Preferably a compressible washer is interposed between the shoulders on the locking nut and fitting.

37 designates a bracket consisting of a hollow shaft which carries at its outer end the lamp and reel structure described and extends inwardly through a support 38, which may be a portion of the closed body of a vehicle. Said tubular shaft is provided at its inner end with a hand wheel 39 by which it may be axially rotated. The tubular shaft is rotatively supported in a hollow flanged bracket 40 that may be attached to the outer face of the support 38, as by means of screws 41. Said bracket is elongated to afford, in connection with the thickness of the support 38, in which the tubular shaft closely fits, an ample rotative bearing for said shaft. As herein shown, said shaft is not a seamless shaft, but is formed from sheet metal by suitable die operations to provide throughout the greater part of its length a tube, and is also swaged at its outer end to form the ring portion 24 through the medium of which the reel casing, and thereby the lamp structure, can be rigidly mounted on and supported by said shaft 37. This formation of the shaft enables a longitudinal slit 42 to be formed through the wall of the made-up shaft at one side thereof, as shown in Figure 1, whereby said tubular shaft can be expanded by spreading apart the edges of the ring at said slit. The edges of said shaft are provided at said slit 42, within the hollow bracket, with semi-circular recesses 43 which register to provide an opening which is threaded to receive a tapered threaded screw 44. The tubular bracket is provided at said screw with a part circular recess 40' into which the outer end of said tapered expanding screw extends, so as to permit the tubular shafts 37 to turn relatively to said hollow bracket 40.

With the construction described it will be observed that the screw 44, when screwed inwardly towards the axis of the slitted shaft, serves to expand said shaft outwardly against the inner wall of the bore of the bracket, whereby a friction lock is effected that will prevent accidental turning of the shaft within the bracket. At the same time this frictional bearing will be such as to allow the shaft 37 and the ring 24 to be rotated by moderate hand power applied to the hand wheel 39. The axis of rotation of the shaft 37 lies between the lamp casing and the reel structure and its casing, and the parts are, therefore, in practice so weighted as to be substantially balanced about said axis. However, the expansion of the slitted tubular shaft 37 serves as a means for frictionally holding said shaft in the bracket 40 to overcome tendency of one or the other of such structures overbalancing about the axis of said shaft 37 under operating conditions. It will be observed that the axis of rotation of the shaft 37 is such, with respect to the focal axis of the lamp, that a comparatively short angular turn of the shaft 37 gives ample range of vertical sweep to the lamp. Moreover, it will be understood that the frictional contact of the shaft 37 with the bracket 40 permits said lamp casing to be swung about the same axis by power applied directly to the lamp casing or to the reel casing, so that it is practicable for a person standing outside the vehicle to both vertically and horizontally adjust the lamp, the horizontal adjustment being due to the rotational joint between the elbow fitting 20 and the neck of the reel casing.

45 designates a shaft within and extending longitudinally of the shaft 37. Said shaft 45 may be made solid or tubular, as desired. It extends at its inner end beyond the inner end of the shaft 37 for attachment thereto by any suitable means of a second hand wheel 46 by which the shaft can be turned on its axis. Said shaft is rotatively mounted at its outer end in a bearing member 47 suitably applied over the outer end of the hollow shaft. Said bearing member, as herein shown, can be formed by an integral part of the metal which is formed up to produce the slitted tubular shaft and the lateral supporting ring 24. 48 designates a worm that is endwise fixed to the shaft 45 between said bearing 47 and a shoulder formed by a collar 49 rigidly fixed to the shaft 45. Said worm meshes with a worm wheel 50 that is herein shown as formed on the periphery of the flange 27 of the neck 22 before referred to. Rotation of the shaft 45 through its handle 46 therefor, has the effect of turning the lamp and reel casing structures, through the worm 48 and the worm gear 50, on the axis of the downturned end 21 of the elbow fitting 20 and such rotation of the shaft 45 serves to adjust the lamp structure in a sidewise direction, depending upon the direction of rotation of said shaft. By reason of the fact that the worm 48 is locked from endwise displacement on the shaft 45, the said worm and worm wheel serve to reliably lock the lamp casing in any position of horizontal adjustment desired.

It will thus be noted that the lamp structure and the reel casing are capable of wide sweeps of adjustment on axes of rotation at right angles to each other, and that such arrangement permits practically universal adjustment of the lamp casing so as to project the lamp's rays substantially in all directions, and that when such adjustments are made the parts are held in the adjustment desired by the locking means referred to.

The construction described provides a very simple, economical, and rugged mounting and lamp adjusting means, capable of being applied in any position where such a universally operable search or spot lamp is required, and especially adaptable for use on vehicles.

With the demountable type of structure shown in Figures 1 and 4, the lamp casing can be removed from its support on the neck of the reel casing by unscrewing the nut 35, whereupon the lamp casing can be removed from its normal station, the lamp cord being at this time unwound from the reel 16. During such unwinding of the cord from the reel, and its subsequent rewinding, the lamp in the casing will always be connected to the source of current supply, as the battery indicated in Figure 4, so that at such times the lamp can be used as a trouble lamp about the car within the length of the cord 17. In order that stress will not be exerted on the terminals 53 of the lamp cord conductors at their connection to the socket terminals, I may provide the lamp cord with an enlargement 54, such as a knot tied therein, and locate said knot or enlargement above an apertured disc 55, which is suitably locked in the lower end of the elbow fitting 20 in the manner shown in Figure 4. As therein shown, said disc is locked in place between a downwardly facing shoulder on the terminal of said fitting and an interior taper by an expansion ring 56.

I claim as my invention:

1. A universal spot lamp mounting, embracing a tubular bracket adapted for rotational mounting and provided at one end with a hand piece to rotate it, a support at the other end of said bracket, a lamp structure, two independent rotational joints to support the lamp structure for rotation on said support in a plane at a right angle to the plane of the rotational axis of said tubular bracket, a shaft within the tubular bracket and geared to one of said rotational joints, the other joint being adapted to be manually rotated, independently of said shaft, and a hand piece for said shaft.

2. A universal spot lamp mounting, embracing a tubular bracket adapted for rotational mounting and provided at one end with a hand piece to rotate it, a support at the other end of said bracket, a lamp structure, two independent rotational joints to support the lamp structure for rotation on said support in a plane at a right angle to the plane of the rotational axis of said tubular bracket, one of said rotational joints embracing a tubular member having an external gear and an interior frictional seat, a member connected to said lamp structure and having a friction member adapted to be frictionally locked on said seat, and a shaft within the tubular bracket geared to said external gear and provided with an independent hand piece.

3. A universal spot lamp and mounting embracing a tubular rotative bracket provided at one end with a hand piece to rotate it, a support at the other end of said bracket for a lamp structure, means for mounting a lamp structure on said support for rotation on an axis at a right angle to the rotational axis of said tubular bracket, and a rotative shaft mounted in said tubular bracket and having at one end a hand piece to rotate it, and a gear connection between the other end of said shaft and said lamp structure, said lamp structure being rotative relatively to the gear connection with means for frictionally holding it in place.

4. A spot lamp and mounting comprising a tubular bracket adapted to be rotatively mounted in a support, with means to frictionally lock it in its mounting and to limit its rotation, said bracket being provided at one end with a hand piece and at its other end with a ring mounting, a lamp structure and a rewinding reel casing supported on the ring mounting, the former to rotate on an axis in a plane at a right angle to the plane of the axis of said tubular bracket and provided with a worm gear, a rotative shaft within and having bearing in said tubular bracket and provided with a hand wheel, and a worm meshing with said gear and endwise and rotatively fixed on said shaft.

5. A spot lamp and its mounting comprising a tubular shaft adapted to be rotatively mounted in a support and provided with a hand wheel, said shaft being formed at one end with a supporting ring, a lamp cord reel casing fixed to said supporting ring, a neck rotatively mounted in said ring on an axis at a right angle to the rotational axis of said tubular shaft and provided with an external gear, a lamp casing bracket connecting said neck and the lamp casing, and a second shaft extending through said tubular shaft and provided with a gear to mesh with said external neck gear.

6. A spot lamp and its mounting comprising a tubular shaft adapted to be rotatively mounted in a support and provided with a hand wheel, said shaft being formed at one end with a supporting ring, a lamp cord reel casing fixed to said supporting ring, a neck rotatively mounted in said ring on an axis at a right angle to the rotational axis of said tubular shaft and provided with an external gear, a lamp casing, a bracket between the lamp casing and neck and rotatively mounted in the neck, and a second shaft extending through the tubular shaft and provided with an operating wheel and with a gear to mesh with the gear on said neck.

7. A spot lamp and its mounting comprising a tubular shaft adapted to be rotatively mounted in a support and provided with a hand wheel, said shaft being formed at one end with a supporting ring, a lamp cord reel casing fixed to said supporting ring, a neck rotatively mounted in said ring on an axis at a right angle to the rotational axis of said tubular shaft and provided with an external gear, a lamp casing bracket connecting said neck and the lamp casing, and a second shaft extending through said tubular shaft and provided with a gear to mesh with said external neck gear, said bracket having a separable joint with said neck whereby the lamp casing may be demounted relatively to said reel casing.

8. A spot lamp and its mounting comprising a tubular shaft adapted to be rotatively mounted in a support and provided with a hand wheel, said shaft being formed at one end with a supporting ring, a lamp cord reel casing fixed to said supporting ring, a neck rotatively mounted in said ring on an axis at a right angle to the rotational axis of said tubular shaft and provided with an external gear, a lamp casing, a bracket connecting said neck and lamp casing, and a second shaft extending through said tubular shaft and provided with a gear to mesh with said external neck gear, said shafts being located in a plane between the said lamp and reel casing.

9. A spot lamp and mounting comprising a tubular shaft adapted to be rotatively mounted in a support and provided with a hand wheel, said shaft being formed at its outer end with a supporting ring, a lamp cord reel casing fixed to said ring, a neck rotatively mounted in said ring and provided with an external worm gear, a lamp casing, a bracket arm connecting said lamp casing and neck, a second shaft extending axially through the tubular shaft and provided with an operating wheel, a worm on said inner shaft to mesh with said external gear, and a thrust bearing operatively associated with the inner shaft at said worm.

In witness whereof I claim the foregoing as my invention, I hereunto append my signature this 27 day of July, 1921.

ERNST G. K. ANDERSON.